United States Patent [19]
Levy

[11] 3,724,913
[45] Apr. 3, 1973

[54] ELECTRODYNAMIC SELF-LAPPING VALVE

[75] Inventor: José Levy, Paris, France

[73] Assignee: Compagnie des Freins et Signaux Westinghouse, Freinville-Sevran, France

[22] Filed: Mar. 18, 1971

[21] Appl. No.: 125,627

[30] Foreign Application Priority Data

Mar. 26, 1970 France..................................7011014

[52] U.S. Cl. ........................303/20, 91/433, 250/215, 303/3
[51] Int. Cl. ...........................B60t 15/02, B60t 13/68
[58] Field of Search ..........91/433; 303/3, 20, 68, 52, 303/54; 250/215

[56] References Cited
UNITED STATES PATENTS 3,528,709   9/1970   Engle ......................................303/20

Primary Examiner—Milton Buchler
Assistant Examiner—John J. McLaughlin
Attorney—Ralph W. McIntire, Jr.

[57] ABSTRACT

Electrodynamic self-lapping valve apparatus for controlling supply and release of fluid pressure for a fluid pressure operable device by electromagnetically selectively positioning a light shield between a source of light and a selected one of a plurality of light responsive sensors, said apparatus also including pressure differential means responsive to the degree of fluid pressure supplied or released for restoring the light shield to a neutral position to effect a lap condition of the apparatus.

7 Claims, 1 Drawing Figure

PATENTED APR 3 1973　　　　　　　　　　　　　3,724,913
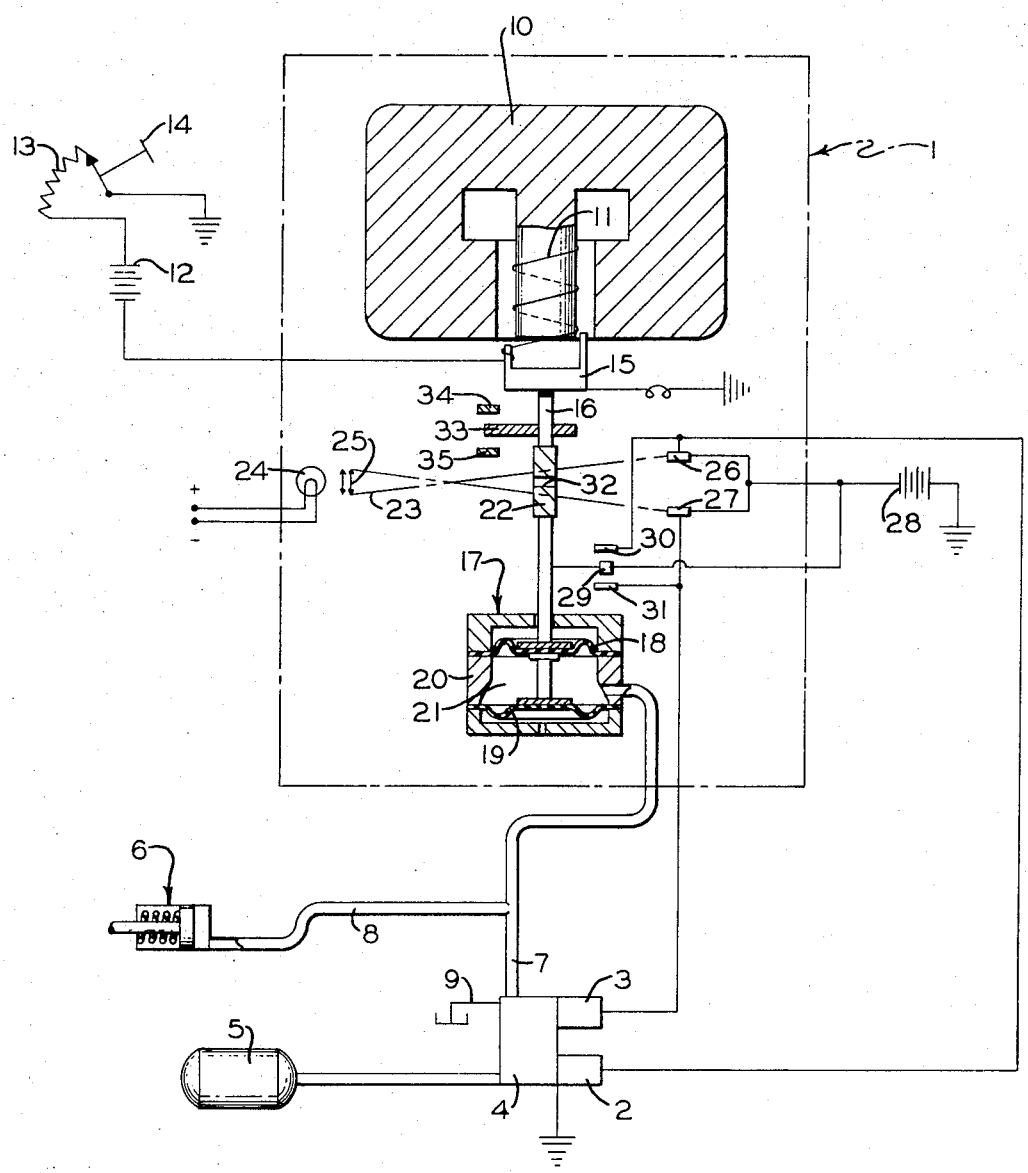
INVENTOR.
JOSÉ LEVY
BY Ralph W. McIntire
ATTORNEY

ELECTRODYNAMIC SELF-LAPPING VALVE

BACKGROUND OF THE INVENTION

With the advent of high speed railway vehicles and trains, the need for brake equipment having a higher degree of sensitivity and response to control impulses initiated by the operator becomes more acute. Some of the presently used brake apparatus of the fluid pressure operable type employ electrically actuated valve devices disposed throughout the train, said valve devices having associated therewith fluid pressure operable switches which are remotely actuated when the operator operates his brake valve to effect supply of operating fluid pressure thereto. Since such control signals or impulses are thus communicated via fluid pressure conduits, the response may not be as quick or sensitive as desired.

SUMMARY OF THE INVENTION

The object of the present invention, therefore, is to provide valve apparatus including remotely controlled fluid pressure supply and release valves and means for remotely actuating said valves, said means providing a high degree of sensitivity and quick response to the control signal or impulse initiated by the operator.

Briefly, the invention comprises electromagnetically controlled self-lapping fluid pressure supply and release valve apparatus for railway type brakes, said apparatus including a light source and a plurality of light responsive sensors associated with respective control circuits for fluid pressure supply and release valve devices, said valve devices being selectively actuable responsively to energization of the respective light responsive sensor. Energization of the selected sensor and, therefore, actuation of the respective valve device, as effected by movement of an electromagnetically actuated shield member out of a light-shielding position to a light-transmitting position, is effected by manual operation of a rheostat to a preselected degree for effecting supply or release of fluid pressure at a degree corresponding to the degree of rheostat operation. The apparatus also includes fluid pressure differential means responsive to the degree of fluid pressure supply or reduction for counteracting the electromagnetic force imposed on the shield member, restoring said shield member to its light-shielding position, and placing the apparatus in a lap condition.

The single FIGURE drawing is primarily a schematic view, with certain components in section, of brake apparatus embodying the invention.

DESCRIPTION AND OPERATION

As shown in the drawing, the apparatus embodying the invention comprises a control block 1, represented generally by a broken outline, which comprises control apparatus, to be hereinafter described, for controlling operation of an electromagnetic fluid pressure supply valve device 2 and an electromagnetic fluid pressure release valve device 3 mounted on a common pipe bracket 4, and since the details of said valve devices and pipe bracket are not considered essential to an understanding of the invention, they have not been shown. When supply valve device 2 is actuated, supply of fluid under pressure from a storage reservoir 5 to a brake cylinder device 6 is effected via pipe bracket 4, a pipe 7 and a branch pipe 8, whereas, when release valve device 3 is actuated, fluid pressure is released from said brake cylinder to atmosphere via pipes 8 and 7, pipe bracket 4 and an atmospheric vent 9.

The control block 1 includes a permanent magnet 10 characterized by a constant radial magnetic field and having centrally disposed in the air gap thereof a movable coil 11 through which electrical current from a source 12 may be passed. The degree of current supplied to coil 11 is controlled by a rheostat 13 which may be operated by a brake pedal 14. Coil 11 moves integrally with and is carried by an armature 15 having one terminal connected with the electrical source 12 and another terminal connected to ground.

Armature 15 is coaxially mounted in insulated manner on one end of an operating rod 16, the other end of said rod having concentrically affixed thereto a differential pressure device 17 comprising a pair of diaphragm pistons 18 and 19 axially spaced apart on said rod and of different diameters and, therefore, different effective pressure areas. Diaphragms 18 and 19 cooperate with a casing 20, between the several sections of which the respective peripheral edges of said diaphragms are sealingly clamped, to form an airtight pressure chamber 21 connected to pipe 7 and, therefore, to brake cylinder 6 via branch pipe 8. The diaphragm pistons 18 and 19 thus provide means for sensing a pressure differential between atmosphere and fluid pressure prevailing in brake cylinder 6.

Rod 16 also has a shield member 22 axially fixed thereon in such position that when said rod is in a neutral position, as shown and to be hereinafter described, said shield member occupies a cut-off position in which a light beam 23 emitted by a light source 24 and directed by optical means 25, such as lenses, on a path in line with two photodiodes or light sensors 26 and 27, is interrupted or cut off. The photodiodes 26 and 27 are electrically connected to the supply and release valves 2 and 3, respectively, and to a common source of electrical energy 28.

Rod 16 also carries an electrical contact or switch element 29 connected to electrical source 28 and conveniently located for making contact with one or the other of a pair of electrical contacts 30 and 31, depending upon which axial direction said rod is moved out of its neutral position. In the neutral position of rod 16, contact 29 also occupies a neutral position relative to contacts 30 and 31, which are electrically connected to valve devices 2 and 3, respectively.

In the absence of current in coil 11, said coil is biased by permanent magnet 10 to a neutral position coinciding with the neutral position of rod 16 and the cut-off position of shield member 22. When coil 11 is energized by current from source 12 following depression of brake pedal 14, said coil, cooperatively with the permanent magnet 10, causes armature 15 and, therefore, rod 16 to be subjected to an axially directed force, the direction of which force depends upon flow direction of the current and direction of winding of the coil. Assuming the direction of this axial force to be upwardly, as viewed in the drawing, armature 15 and rod 16 are accordingly displaced to thereby move the light shield member 22 into an aligned position in which an aperture 32 formed in the light shield member is aligned with light beam 23 and photodiode 26, which is consequently energized by the light beam. Energization of photodiode 26 closes the electrical circuit of supply valve device 2 which, in conventional manner, effects supply of fluid under pressure from reservoir 5 to brake cylinder 6. Such fluid pressure prevailing in brake cylinder 6 is also delivered, via pipe 7, to chamber 21 of the differential pressure device 17. Since the effective pressure area of diaphragm piston 18 is smaller than that of diaphragm piston 19, a force proportional to the pressure differential between said diaphragm pistons and to the pressure delivered, counteracts the electromagnetic force of armature 15 to effect downward displacement of said armature and, therefore, of rod 16 to its neutral position in which light shield 22 cuts off the light beam from photodiode 25. Consequently, supply valve 2 is also deenergized to cut off further supply of fluid under pressure to brake cylinder 6. The apparatus is thus placed in a lapped state in which the degree of fluid pressure in brake cylinder 6 corresponds to and is determined by the magnitude of the electromagnetic force acting upwardly on armature 15, which, of course, is determined by the extent of depression of brake pedal 15, and, therefore, the degree of current thus supplied to coil 11 from source 12.

If, during such time that fluid pressure prevails in brake cylinder 6 and, therefore, in chamber 21 of the differential pressure device 17, brake pedal 14 is released a preselected degree, the electromagnetic force acting upwardly on armature 15 and rod 16 is correspondingly reduced so that the downward force exerted by fluid pressure prevailing in said chamber is effective for overcoming said upward force and causing downward movement of said rod until aperture 32 in light shield 22 is placed in alignment with light beam 23 and photodiode 27. As a result, release valve device 3 is actuated to place both the brake cylinder 6 and chamber 21 in communication with atmosphere via vent 9, venting of which continues until the consequently reduced downward force exerted by the differential pressure device 17 is balanced by the reduced electromagnetic upward force, whereupon rod 16 and light shield 22 assume respective neutral positions and the apparatus assumes a lapped condition, as above explained, until such time that a further change of brake pedal position is effected.

In the event that photodiodes 26 and 27, for any reason, fail to function, electrical contact 29 carried on rod 16 is moved into contact with one or the other of contacts 30 or 31 when said rod moves upwardly or downwardly to thereby insure actuation of the appropriate valve device 2 or 3.

It is evident that the two diaphragm pistons 18 and 19 comprising the pressure differential device 17 can be replaced by a single diaphragm or piston responsive to pressure supplied to the brake cylinder 6. Since, by nature, the electromagnetic forces generated by the coil 11 and armature 15, when energized, are relatively weak, however, the fluid pressure counter forces exerted by the pressure device 17 must be equally weak, and, as is understood by those skilled in the art, such weak forces may be provided with greater facility and accuracy with the use of differential diaphragm pistons as used in the device 17.

In order to limit axial displacement in both directions of armature 15 and rod 16 and thereby prevent inadvertent exposure of the photodiodes 26 and 27 to light beam 23 by over-travel of light shield 22, a stop member 33 is positionally adjustable on said rod (in suitable manner not shown) and is adapted for contacting oppositely spaced-apart stop elements 34 and 35 fixed in the control block 1 relative to said stop member.

Having now described the invention, what I claim as new and desire to secure by Letters Patent, is:

1. Electrodynamic self-lapping valve apparatus comprising:
   a. a source of fluid under pressure,
   b. a fluid pressure operable device;
   c. electromagnet valve means including a supply valve and a release valve alternatively energizable for effecting supply of fluid under pressure from said source to said fluid pressure operable device and release of such fluid pressure from the fluid pressure operable device, respectively;
   d. electrical circuitry means including a source of electrical energy and respective circuits connected to said supply valve and said release valve,
   e. said circuits being normally open and each being effective when alternatively closed for energizing the respective one of said supply and release valves;
   f. a member having a neutral position in which both said circuits are open and being movable in one direction out of said neutral position to a first position in response to a first force acting thereon in said one direction and in an opposite direction to a second position in response to a counter force acting thereon in said opposite direction;
   g. means carried on said member and effective in the first position of said member for closing one of said circuits for energizing one of said supply and release valves and effective in the second position of said member for closing the other circuit for energizing the other of said supply and release valves;
   h. variable energizable electromagnetic means operable responsively to electrical energization for exerting said first force on said member at a degree corresponding to the degree of such electrical energization; and
   i. fluid pressure means responsive to fluid pressure supplied to said fluid pressure operable device for exerting said counter force on said member according to the degree of fluid pressure supplied to the fluid pressure operable device and being effective, when said first and counter forces are equal, for restoring said member to its said neutral position.

2. Electrodynamic self-lapping valve apparatus, as set forth in claim 1, wherein said variably energizable electromagnetic means comprises:
   a. a permanent magnet having a centrally formed recess;
   b. a coil coaxially disposed in said recess;
   c. an armature carrying said coil and having said member connected thereto in axial alignment for movement therewith;
   d. said armature normally being biased by said permanent magnet to a neutral position coinciding with the neutral position of said member and being movable in said one direction upon energization of the coil; and e. rheostat means for effecting variable energization of said coil.

3. An electrodynamic self-lapping valve apparatus, as set forth in claim 2, wherein said member comprises a rod having said armature affixed at one end thereof and said fluid pressure means mounted on the opposite end, said fluid pressure means including a pair of differential pressure area piston members fixed in axially spaced-apart relation on said rod with a pressure chamber formed therebetween and subject to fluid pressure supplied to the fluid pressure operable device.

4. Electrodynamic self-lapping valve apparatus, as set forth in claim 3, wherein the larger of said piston members is positioned relative to the smaller piston member such that the resulting counter force is directed in said opposite direction relative to said first force.

5. Electrodynamic self-lapping valve apparatus, as set forth in claim 1, further characterized by stop means for limiting movement of said member in said one and opposite directions to said first and second positions, respectively.

6. Electrodynamic self-lapping valve apparatus, as set forth in claim 1, wherein:
   a. said electrical circuitry means comprises:
      i. respective light responsive sensors connected in each of said circuits in fixed positions relative to said member, and
      ii. a light source emitting a light beam directed on a path in alignment with said light responsive sensors; and
   b. said means carried on said member comprises a light-shielding member having an aperture formed therein, said light-shielding member being so positioned on said member as to interrupt said light beam when said member is in its said neutral position and to place said aperture in alignment with one of said sensors in the first position of said member and in alignment with the other of said sensors in the second position of said member for closing the respective circuit.

7. Electrodynamic self-lapping valve apparatus, as set forth in claim 6, further characterized by fail-safe means comprising:
   a. a pair of contact elements connected in said circuits in parallel relation to said light responsive sensors, respectively, and in fixed relation to said member; and
   b. a switch element fixed on said member in such a position as to occupy a neutral position out of contact with said contact elements when said member is in its said neutral position,
   c. said switch element being operable to a first contact position in contact with one of said contact elements and to a second contact position in contact with the other contact element for alternatively closing one or the other of said circuits upon movement of said member to its said first and second positions, respectively.

* * * * *